United States Patent
Iyer et al.

(10) Patent No.: US 8,429,360 B1
(45) Date of Patent: Apr. 23, 2013

(54) METHOD AND SYSTEM FOR EFFICIENT MIGRATION OF A STORAGE OBJECT BETWEEN STORAGE SERVERS BASED ON AN ANCESTRY OF THE STORAGE OBJECT IN A NETWORK STORAGE SYSTEM

(75) Inventors: Rahul Iyer, Sunnyvale, CA (US); Deepak Kenchammana-Hosekote, Sunnyvale, CA (US); Arthur F. Lent, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 768 days.

(21) Appl. No.: 12/618,415

(22) Filed: Nov. 13, 2009

Related U.S. Application Data

(60) Provisional application No. 61/246,395, filed on Sep. 28, 2009.

(51) Int. Cl.
G06F 12/00 (2006.01)

(52) U.S. Cl.
USPC ............... 711/162; 711/6; 711/112; 711/147; 711/170; 707/639; 707/649; 718/1

(58) Field of Classification Search ............... 711/162, 711/6, 112, 147, 170; 707/639, 649; 718/1
See application file for complete search history.

(56) References Cited

U.S. PATENT DOCUMENTS

| | | | |
|---|---|---|---|
| 6,356,977 B2 * | 3/2002 | Ofek et al. | 711/112 |
| 6,671,773 B2 * | 12/2003 | Kazar et al. | 711/112 |
| 7,058,731 B2 * | 6/2006 | Kodama | 710/5 |
| 7,103,740 B1 * | 9/2006 | Colgrove et al. | 711/162 |
| 7,237,079 B2 * | 6/2007 | Kaneda et al. | 711/162 |
| 7,464,116 B2 * | 12/2008 | Sarma et al. | 1/1 |
| 7,797,303 B2 * | 9/2010 | Roulland et al. | 707/713 |
| 7,822,933 B1 * | 10/2010 | Sontakke et al. | 711/162 |
| 7,996,636 B1 * | 8/2011 | Prakash et al. | 711/162 |
| 8,032,498 B1 * | 10/2011 | Armangau et al. | 707/690 |
| 8,122,213 B2 * | 2/2012 | Cherian et al. | 711/162 |
| 8,255,484 B2 * | 8/2012 | Khandekar et al. | 709/217 |
| 2003/0212854 A1 * | 11/2003 | Kitamura et al. | 711/112 |
| 2006/0179170 A1 * | 8/2006 | Kodama | 710/8 |
| 2010/0153617 A1 * | 6/2010 | Miroshnichenko et al. | 711/6 |

OTHER PUBLICATIONS

Kozuch, Michael et al., "The Internet Suspend/Resume (ISR)", Apr. 2002, 8 Pages.
EMC Avamar, "Optimized VMware Backup and Recovery with EMC Avamar and EMC CLARiiON Replication Technology, Applied Technology," Dec. 2008, pp. 1-15.
Tridgell, Andrew et al., "The RSync Algorithm," Department of Computer Science, Australian National University, Canberra, ACT 0200, Australia, Nov. 9, 1998, pp. 1-11.
Riverbed, "Improve Application Performance with WAN Optimization: Cut Costs and Improve Performance with WAN Optimization," as downloaded Oct. 21, 2009 http://www.riverbed.com/results/solutions/index.php, pp. 1-2.

* cited by examiner

*Primary Examiner* — Stephen Elmore
(74) *Attorney, Agent, or Firm* — Blakely, Sokoloff, Taylor & Zafman LLP

(57) ABSTRACT

Embodiments of the present invention provide a method and system, in a network storage system, for efficiently migrating a storage object (vdisk) from a first storage server (source) to a second storage server (destination) using data of a related vdisk at the destination. A related vdisk includes an earlier created vdisk (parent) from which the vdisk to be migrated (child) is generated (cloned). By virtue of the cloned relationship, the parent and child have a portion of data blocks in common. When a parent is available at the destination, only the changed data blocks between the parent and child need to be migrated for efficiently constructing the child at the destination.

32 Claims, 10 Drawing Sheets

| Ancestry Object 415 | |
|---|---|
| Object ID | F4 |
| Direct Parent Object ID | F2 |
| Indirect Parent Object ID | F1 |
| Indirect Parent Object ID | ⋮ |

FIG. 4B

METHOD AND SYSTEM FOR EFFICIENT MIGRATION OF A STORAGE OBJECT BETWEEN STORAGE SERVERS BASED ON AN ANCESTRY OF THE STORAGE OBJECT IN A NETWORK STORAGE SYSTEM

RELATED APPLICATIONS

The present application claims the benefit of the filing date of U.S. provisional patent application Ser. No. 61/246,395, filed Sep. 28, 2009, which is incorporated herein by reference.

FIELD OF THE INVENTION

The present invention relates to network storage systems, and more particularly, to efficiently migrating a storage object from a first storage server to a second storage server based on data of a related storage object available at the second storage server.

BACKGROUND

A storage server is a computer that provides access to information that is stored on one or more storage devices connected to the storage server, such as disk drives ("disks"), flash memories, or storage arrays. The storage server includes an operating system that may implement a storage abstraction layer such as a file system to logically organize the information as a hierarchical structure of storage objects such as directories and files on a storage device (e.g., disk). Each file may be implemented as set of data structures, e.g., data blocks, configured to store information, such as the actual data for the file.

The representation of the file system on disk may be block-based using, e.g., 4 kilobyte (kB) blocks, and using inodes to describe the files. An inode is a data structure which stores information about a file, directory, or other file system such as user and group ownership, access mode (read, write, execute permissions) and type of file. An inode for a file may include pointers to blocks on disk constituting the actual file.

A storage server may be configured to operate according to a client/server model of information delivery to allow one or more clients access to data stored on the storage server. Access may be provided by the storage server using a file-level service such as used in a network-attached storage (NAS) environment, a block-level service such as used in a storage area network (SAN) environment, a service providing both file-level and block-level access, a content-level service, or any other data access service implemented by the storage server. In this model, the client may comprise an application executing on a computer that "connects" to the storage server over a computer network, such as a point-to-point link, shared local area network, wide area network or virtual private network implemented over a public network, such as the Internet. A client may access the storage devices by submitting access requests to the storage server, for example, a "write" request to store client data included in a request to storage devices or a "read" request to retrieve client data stored in the storage devices.

Multiple storage servers may be networked or otherwise connected together as a network storage system to provide access to storage objects of the storage servers. In order to optimize the use of physical resources in a networked environment, data storage requests may be distributed among the storage servers for back-up purposes to protect against disasters with one of the storage servers or for avoiding processing bottlenecks at one of the storage servers. Accordingly, a storage object such as a file, for instance, may be copied from one storage server (referred to herein as the "source" or "source storage server") to another storage server (referred to herein as the "destination" or "destination storage server") for providing a copy of the file at the destination. When implemented to alleviate the processing load at the source, the copy operation may be referred to as "migrating" or "copy-offloading" the file from the source to the destination since the destination performs storage requests on the file to offload processing of the file by the source.

Copy offloading is particularly advantageous when the client connected to the storage server is a computer (host or primary client) implementing computer virtualization techniques for servicing requests from other computers (secondary clients) connected to the host. Virtualization is a process by which the underlying physical components of a computer are abstracted into logical components and may be presented as multiple virtual machines, giving the appearance to users of many computers which are operative on a single physical computer. By utilizing virtualization, the host is optimized to handle data requests from secondary clients by dedicating one virtual machine to one of the secondary clients, dedicating another virtual machine to another secondary client, etc.

In support of host virtualization capabilities, a storage server may maintain a type of storage object referred to as a "vdisk" to emulate a disk in a virtualized environment for each virtual machine. A vdisk may include data constituting operating system, application, configuration, and user files, as well as export controls and operation restrictions to mimic that of a physical disk. When a secondary client requests data from a virtual machine on the host, the host accesses a vdisk at the storage server which is associated with the particular virtual machine and performs the requested data retrieval or storage operation on the vdisk.

In the creation of vdisks, a storage server may use the configuration of a previously created vdisk ("existing vdisk") so that the configuration of a new vdisk need not be manually constructed. Typically, vdisks constitute a portion of the same data (e.g., operating system and application files) as other vdisks, so blocks storing data may be commonly referenced by the vdisks to avoid storage of redundant blocks. To accomplish this, a storage server may copy the inode of an existing vdisk in a process referred to as "cloning" to allow the new vdisk to reference the same blocks as the existing vdisk. Any future changes to the new vdisk (e.g., configuration changes or new data stored on the vdisk) may then be written to new blocks followed by an update to the inode of the new vdisk. In this way, new vdisks are created to optimize storage capacity by avoiding redundant data blocks and to eliminate or reduce the need for manual construction of a new vdisk.

Advantageously, vdisks may be distributed between storage servers to further optimize performance of the storage servers by offloading the vdisk from a heavily loaded storage server to a less loaded storage server. When migrating vdisks, however, a decrease in performance of the storage system may occur. Network bandwidth for servicing normal data requests from primary clients may be diminished while data is migrated between storage servers. Further, since each vdisk may constitute a substantial amount of data, a lengthy transfer period delays the ability of the destination to judiciously service requests intended for the vdisk. This delay may even amount to weeks in certain cases.

A technique for overcoming these limitations includes migrating only those blocks of the vdisk which are not already available at the destination and may be referred to as "deduplication". By avoiding the migration of duplicate data, a storage server may advantageously conserve processing resources for performing other storage tasks, as well as optimize overall storage capacity of the system. One conventional deduplication approach involves dividing the vdisk into fixed or variable portions at the source and generating a fingerprint for each portion. The fingerprint may be, for example, a checksum operation (checksum) of the underlying data and is operative as a unique identifier for such data but constitutes a smaller size than the underlying data. In lieu of sending the underlying data, the source sends only the fingerprint to the destination whereby a determination is made whether the fingerprint already exists at the destination. Only those portions of data for which fingerprints are not already at the destination are then sent to the destination. With certain checksum algorithms, however, a "collision" may occur where a fingerprint may not uniquely identify the underlying blocks. This occurs when a checksum for one portion of blocks results in the same checksum for another portion of blocks. An adverse consequence of a collision includes potentially the wrong blocks being sent to the destination.

An alternative approach for determining blocks already available at the destination involves identifying a prior version of a storage object at the destination and providing only the changed blocks between the current version and prior version to the destination. A version of a storage object involves a copy of blocks of a previous version to result in a duplicate set of blocks to which new data may be written without modifying data of the previous version. A version relationship thus generally indicates a portion of common data (e.g., duplicate data) as between two or more storage objects. With vdisks, however, the versioning approach may be counterproductive when implementing storage savings techniques since creating multiple versions of a vdisk involves the storage of redundant data at the source. Accordingly, while storage savings may be achieved at the destination, such savings are achieved at the expense of additional storage capacity required at the source. This alternative approach is therefore deficient in efficiently off-loading storage objects from a source to destination while optimizing overall storage system capacity.

SUMMARY

Embodiments of the present invention provide a method and system, in a network storage system, for efficiently migrating a storage object (e.g., vdisk) from a first storage server (source) to a second storage server (destination) based on data of a related vdisk available at the destination. A related vdisk includes a parent of the vdisk which constitutes an earlier created vdisk from which the vdisk to be migrated (referred to herein as a "child") is generated (cloned). By virtue of the cloned relationship, the parent and child have a portion of data in common. When a parent is available at the destination, only the changed blocks between the parent and child need to be migrated for efficiently constructing the child at the destination to offload the vdisk from the source.

A novel migration system generates a parent indicator for each cloned child which constitutes an attribute which identifies the vdisk from which the child is cloned. The vdisk identified by the parent indicator is referred to as a "direct parent" of the child. The direct parent may also be cloned from another earlier created vdisk, and as such, each of the parents having an indirect cloning relationship to the child is referred to as an "indirect parent" of the child.

Upon the source receiving a request to migrate a vdisk, the novel migration system generates an ancestry of the vdisk to be migrated, the ancestry including the direct and indirect parents of the child, if any. The ancestry may include an attribute of the vdisk indicating a hierarchy of vdisks from which the child descends. A determination is then performed to identify whether a parent of the vdisk is available at the destination using the ancestry provided in the request from the source. If the direct parent is unavailable, the destination determines whether an indirect parent is available at the destination.

Once a direct or indirect parent is determined to be at the destination (such parent referred to as the "common parent"), the destination requests the changed blocks between the child and the common parent. Upon receipt of the changed blocks, a list of blocks constituting the vdisk (e.g., an inode) is cloned from the common parent at the destination and updated with pointers to the changed blocks. The set of blocks referenced by the inode then constitute the vdisk at the destination that may be constructed without obtaining all the blocks of the vdisk from the source.

By determining a related file (e.g., common parent) of the vdisk at the destination, the novel migration system efficiently transfers non-redundant blocks of data across the network. Since there is not reliance on unique fingerprints in determining blocks already at the destination, the deficiency with the fingerprint approach is eliminated thereby avoiding the possibility of sending the wrong blocks to the destination. The limitation associated with version approach is also eliminated since one vdisk may be associated with another vdisk by virtue of its cloned relationship referenced in the ancestry of the vdisk to indicate the existence of common blocks between the two vdisks.

Additional aspects of the invention will become apparent from the following detailed description taken in conjunction with the accompanying drawings, which illustrate the principles of the invention by way of example.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 4B illustrates an exemplary ancestry object for indicating an ancestry of a vdisk;

DETAILED DESCRIPTION

A method and system for efficiently migrating a storage object from a source storage server to a destination storage server based on data of a related storage object at the destination storage server is provided herein. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

System Overview

Figure 1A:
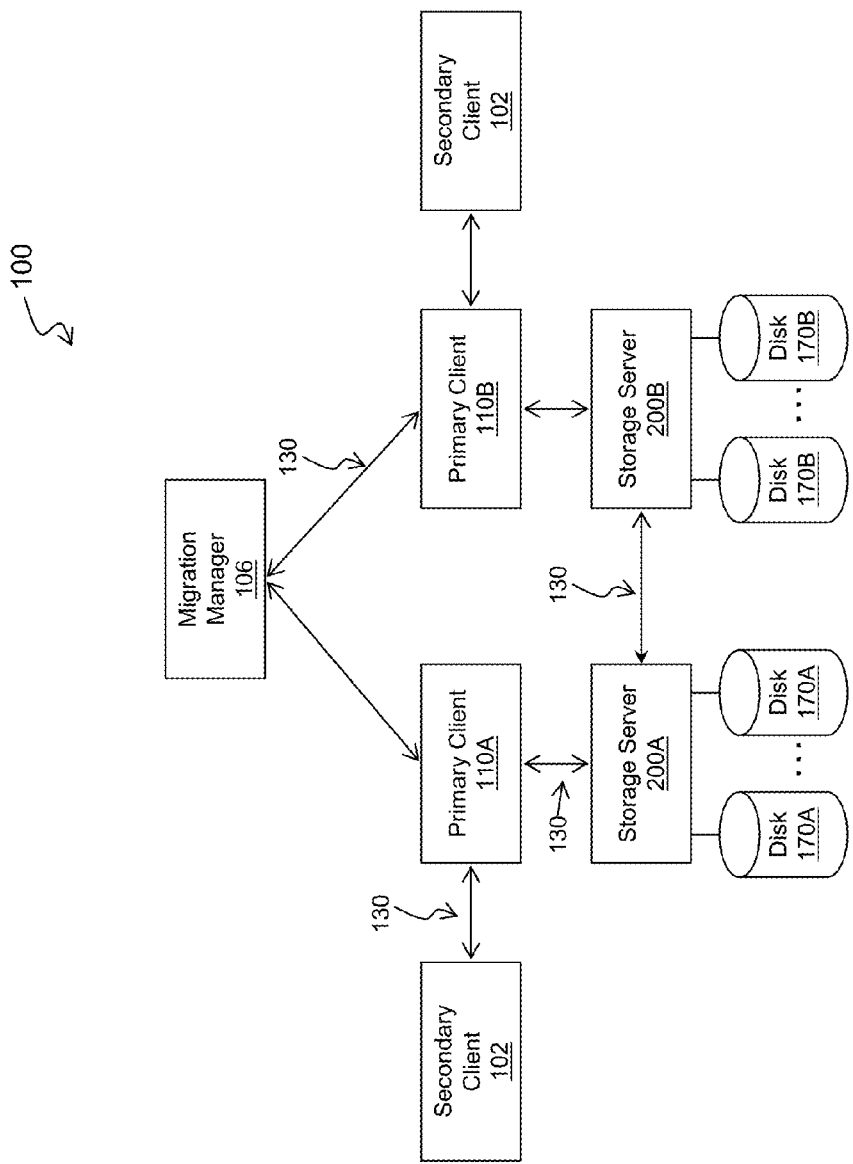
FIG. 1A illustrates a network storage system in which the present invention may be implemented.

FIG. 1A shows a network storage system 100 in which the present invention can advantageously be implemented in one embodiment. Storage servers 200 each manage multiple storage units 170 that include mass storage devices (not shown). These storage servers provide data storage services to one or more primary clients 110 through a network 130. Network 130 may be, for example, a local area network (LAN), wide area network (WAN), metropolitan area network (MAN), global area network such as the Internet, a Fibre Channel fabric, or any combination of such interconnects. Each of primary clients 110 may be, for example, a conventional personal computer (PC), server-class computer, workstation, handheld computing or communication device, or other special or general purpose computer.

Storage of data in storage units 170 is managed by storage servers 200 which receive and respond to various read and write requests from primary clients 110, directed to data stored in or to be stored in storage units 170. Storage units 170 are comprised of mass storage devices which can include, for example, flash memory, magnetic or optical disks, or tape drives. The storage devices in storage units 170 can further be organized into arrays (not shown in this figure) implementing a Redundant Array of Inexpensive Disks/Devices (RAID) scheme, whereby storage servers 200 access storage units 170 using one or more RAID protocols known in the art. Moreover, storage servers 200 can provide file-level service such as used in a network-attached storage (NAS) environment, block-level service such as used in a storage area network (SAN) environment, a service which is capable of providing both file-level and block-level service, or a service which is capable of providing any other object-level or content-level services. Although storage servers 200 are each illustrated as single units in FIG. 1A, a storage server can, in other embodiments, constitute a physically separate network blade or module (an "N-Module") and disk blade or module (a "D-Module"). In one embodiment, the D-Module includes data processing and storage access components. In contrast, the N-Module includes functionality that enables a client access to storage access components (e.g., the D-Module) and includes protocol components, such as Common Internet File System (CIFS), Network File System (NFS), or an Internet Protocol (IP) module, for facilitating such connectivity. Details of a distributed architecture environment involving D-Modules and N-Modules are described further below with respect to FIG. 1B.

In yet other embodiments, storage servers 200 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, minoring, etc., provided, for example, on archive, backup, or secondary storage systems connected to a primary storage system. A network storage subsystem can also be implemented with a collection of networked resources provided across multiple storage servers and/or storage units.

Illustratively, primary clients 110 are each operative as a server-class computer (host), often implementing computer virtualization techniques known in the art. One example of such a server-class computer includes VMWare® ESX Server available from VMWare, Inc. of Palo Alto, Calif. Primary clients 110 implemented as hosts may be connected to one or more secondary clients 102 also via network 130. Each of secondary clients 102 may be, for example, a conventional personal computer (PC), server-class computer, workstation, handheld computing or communication device, or other special or general purpose computer. In the exemplary embodiment, each of secondary clients 102 implements a thin client computer which depends on the hosts (e.g., primary clients 110) for data processing power and capabilities.

In operation, secondary clients 102 issue various read and write requests to primary clients 110, which are processed, e.g., by virtual machines of primary clients 110. Responsive to such requests from secondary clients 102, primary clients 110 may further submit various read and write requests to storage servers 200 directed to data stored in or to be stored, e.g., as storage objects in storage units 170. Storage servers 200 then carry out the data storage requests of primary clients 110, thereby enabling primary clients 110 to respond to requests from secondary clients 102.

A migration manager 106 in the exemplary embodiment is also operative in environment 100 for directing data storage requests from primary clients 110 to the appropriate storage server servicing particular storage objects such as vdisks. Migration manager 106 further prompts storage server 200A (e.g., source) to migrate a vdisk stored on disks 170A to storage server 200B (e.g., destination) for storage on disks 170B. In one embodiment, migration manager 106 may be a conventional personal computer (PC), server-class computer, workstation, handheld computing or communication device, or other special or general purpose computer, which connects to primary clients 110 via network 130. In certain embodiments, migration manager 106 may be implemented in the same processing environment as any of storage servers 200, so environment 100 is not so limited to the embodiment described herein.

At a point in time, a user such as a storage administrator (administrator) may interface at a console (not shown in this figure) of migration manager 106 using a graphical user interface (GUI) to request that a specific storage object of the source be migrated to the destination. Upon migration manager 106 receiving the migration request, migration manager 106 may prompt storage servers 200 to perform the requested migration task. Alternatively, primary client 110A may be operative to automatically migrate a storage object to primary client 110B upon reaching a certain predefined storage server threshold (e.g., processing load) without prompting from migration manager 106. Such threshold may be supplied by the administrator interfacing with migration manager 106.

Advantageously, storage servers 200 implement a novel migration system (described further in reference to FIG. 4)

for migrating a storage object from a source storage server (e.g., storage server 200A, referred to herein as the "source") to a destination storage server (e.g., storage server 200B, referred to herein as the "destination"). The storage object may be implemented as a vdisk managed by a or a range of disk blocks implemented by block-level services in accordance with various embodiments of the present invention. Illustratively, the storage object is embodied as a vdisk managed by primary client 110 which may be migrated between storage servers 200 using the novel migration system. To that end, vdisk cloning information (e.g., references to one or more vdisks with which the cloned vdisk shares at least one block) is maintained by the migration system and is used in determining a parent of a vdisk at the destination (i.e. the common parent). Upon determining the common parent, the source provides the changed blocks between the vdisk and the common parent. The destination may then construct the vdisk using the blocks of the common parent already at the destination as well as the changed blocks obtained from the source.

Figure 1B:
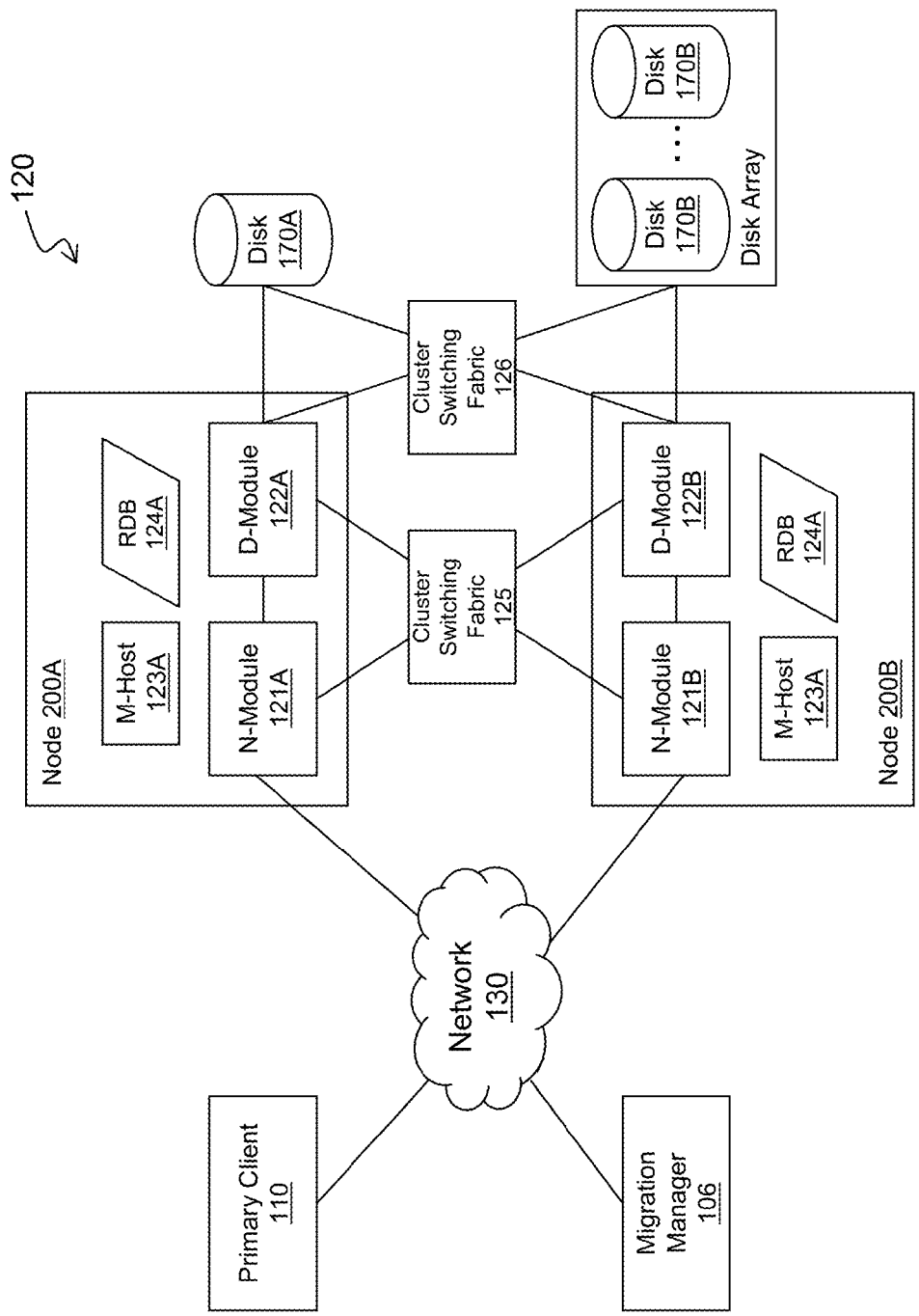
FIG. 1B illustrates a network storage system having a distributed architecture in which the present invention may be implemented.

FIG. 1B illustrates a schematic block diagram of a distributed or clustered network storage system 120 which may implement the principles of the present invention in one embodiment. System 120 may include two storage servers 200 (200A, 200B), wherein each storage server is referred to as a "node." Nodes 200A and 200B are configured to provide services relating to data stored on to be stored to storage devices 170, which are, for example, magnetic disk drives, flash memory, or any other similar media adapted to store information. In the illustrative example, nodes 200 are interconnected by a cluster switching fabric 125 which may be embodied as an Ethernet switch for instance.

Nodes 200 are operative as functional components that cooperate to provide a distributed architecture of system 120. Each node 200 may be organized as a network element or module (N-Module 121A, 121B), a disk element or module (D-Module 122A, 122B), and a management element or module (M-Host 123A, 123B). In one embodiment, each of N-Modules 121, D-Modules 122, and M-Host 123 include a processor and memory for carrying out respective module operations. In detail, N-Module 121 includes functionality that enables node 200 to connect to primary client 110 via network 130. Illustratively, N-Module 121 includes the protocol components such as a media access layer, Internet Protocol (IP) layer, Transport Control Protocol (TCP) layer, User Datagram Protocol (UDP) layer, and other protocols described further in FIG. 3.

In contrast, D-Module 122 connects to one or more storage devices 170 via a cluster switching fabric 126, e.g., an Ethernet switch, and is operative to service requests intended for devices 170. In one embodiment, the D-Module 122 includes data processing and storage access components such as a file system layer, storage layer, and driver layer described further in FIG. 3. Illustratively, the file system layer of the D-Module divides the physical storage of devices 170 into logical storage containers referred to as "volumes". Requests received by node 200 (e.g., via N-Module 121) may include a volume identifier to indicate a particular volume on devices 170 on which to carry out the request.

Also operative in node 200 is M-Host 123 which provides management functions for node 200 operative in system 120 by generating and maintaining a data object such as a RDB 124 (RDB 124A, RDB 124B). RDB 124 contains volume information used by node 200 which may include the physical location of the volumes on storage devices 170 as generated by the file system layer of D-Module 122. The various instances of RDB 124 across respective nodes 200 are updated regularly by M-Host 123 to bring them into synchronization with each other. Information stored in RDB 124 is further used by the N-Modules 121 to identify the appropriate D-Module 122 for any volume to which access is requested.

Network 130 is also operative in system 120 to connect node 200 to primary clients 110 for requesting storage services on devices 170. Migration manager 106 may similarly connect to nodes 200 via network 130 for initiating migration requests to node 200. For example, network 130 may be operative to connect migration manager 106 to N-Module 121 and D-Module 122 of node 200 to facilitate migration operations between nodes.

In further detail, portions of the novel migration system may be operative in the D-Module 122 and N-Module 121 of node 200. For instance, N-Module 121 may be configured to receive requests from migration manager 106 for migrating a storage object such as a vdisk stored on devices 170 from node 200A to node 200B. N-Module 121 may then route the request to the appropriate D-Module 122 for carrying out the requested migration operation. Each of the D-Modules 122 may be configured to perform operations in support of migrating the vdisk from a source node (e.g., node 200A) to a destination node (e.g., node 200B) to alleviate processing load at the source and/or for providing a backup at the destination.

It should be noted that while FIG. 1B shows an equal number of N- and D-Modules constituting a node in the illustrative system, there may be different number of N- and D-Modules constituting a node in accordance with various embodiments of the present invention. For example, there may be a number of N-Modules and D-Modules of node 200A that does not reflect a one-to-one correspondence between the N- and D-Modules of node 200B. As such, the description of a node comprising one N-Module and one D-Module for each node should be taken as illustrative only. An exemplary distributed file system architecture is generally described in U.S. Pat. No. 6,671,773, entitled METHOD AND SYSTEM FOR RESPONDING TO FILE SYSTEM REQUESTS, by M. Kazar et al. issued Dec. 30, 2003, which is incorporated herein by reference.

Computer Architecture

Figure 2:
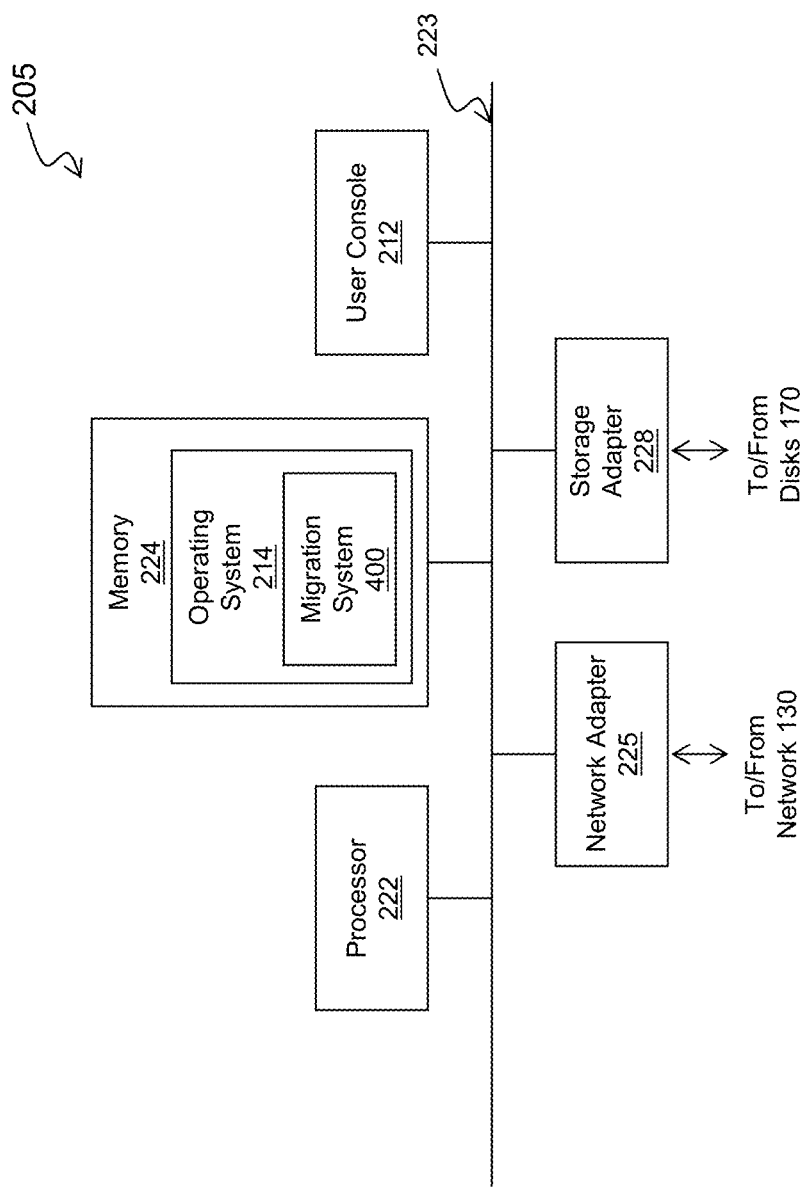
FIG. 2 is a block diagram of an illustrative embodiment of an environment including a storage server of FIG. 1 in which the invention may be advantageously implemented.

FIG. 2 is a block diagram of an illustrative embodiment of a special- or general-purpose computer 205 that may implement a storage server (e.g., each of storage servers 200 from FIG. 1A), a migration manager (e.g., migration manager 106), a host (e.g., each of primary clients 110) or a thin client (e.g., each of secondary clients 102) in various embodiments of the present invention. It will be appreciated that computer 205 need not comprise all the components shown in FIG. 2, so aspects of the invention are not so limited by the embodiment discussed herein.

Computer 205 includes a processor 222, a memory 224, a network adapter 225, and a console 212 interconnected by a system bus 223. In the illustrative embodiment, memory 224 includes storage locations that are addressable by the processor 222 and network adapter 225 for storing processor-executable software program code and data structures associated with the present invention. Network adapter 225 includes the mechanical, electrical and signaling circuitry needed to connect computer 205 over network 130 for instance. The processor and network adapter may thus include processing elements and/or logic circuitry configured to execute software code and manipulate data structures for communicating with other computing devices. An operating system 214, portions of which are typically resident in memory 224 and executed by the processing elements of computer 205, functionally organizes computer 205.

When implemented as a storage server in a distributed architecture (e.g., system 120 of FIG. 1B), computer 205 may also include a cluster access adapter (not shown) connected to bus 223 for facilitating communications between nodes in a clustered environment (e.g., node 200). The cluster access adapter includes a plurality of ports adapted to couple a node to other nodes in the system. In the illustrative embodiment, Ethernet is used as the clustering protocol and interconnect media, although other types of protocols and interconnects may be utilized within the cluster architecture described herein. In alternative embodiments where the N- and D-Modules are implemented on separate systems or computers, the cluster access adapter is utilized by the N-Module (e.g. N-Module 121) and/or D-Module (e.g., D-Module 122) for communicating with other N- and/or D-Modules of the system.

It will be apparent to those skilled in the art that other processing means may be used for executing program instructions and other memory means, including various computer readable media, may be used for storing program instructions pertaining to the inventive techniques described herein. It will also be apparent that some or all of the functionality of the processor element and executable software can be implemented by hardware, such as integrated currents configured as programmable logic arrays, ASICs, and the like.

Illustratively, user console 212 includes, for example, a keyboard and monitor for enabling a user to interface with computer 205. In one embodiment, the administrator interfaces with user console 212 of a migration manager (e.g., migration manager 106) for receiving the storage object name and source and destination storage server names for a storage object to be migrated. User console 212 may receive such information from the administrator and store such information as one or more data structures in memory 224, for example. In another embodiment, the administrator supplies a threshold (e.g., loading) of the source that when reached, automatically causes the source to migrate the respective storage object to the destination.

When implemented as a storage server, computer 205 also includes a storage adapter 228 for storing data on storage devices (e.g., disks 170). Storage adapter 228 includes input/output (I/O) interface circuitry that couples to disks 170 over an I/O interconnect arrangement, such as a conventional high-performance, Fibre Channel serial link topology. Illustratively, storage adapter 228 is operative with operating system 214 executing on computer 205 to access information on disks 170. The functionality of storage adapter 228 may be invoked by processor 222 in response to requests from a host (e.g., one of primary clients 110). Information may be retrieved by storage adapter 228 and, if necessary, processed by the processor 222 (or storage adapter 228 itself) prior to being forwarded over system bus 223 to network adapter 225, where information is returned to a requesting host.

In an exemplary storage server embodiment, operating system 214 implements a file system (not shown in this figure) that logically organizes information as a hierarchical structure of directories and files on disks 170. Each file may be implemented as a set of data blocks configured to store information of a file. When supporting virtualization techniques of a host, a file may be implemented as a vdisk, storing operation system, application and user files as a set of blocks on disks 170. Preferably operation system 214 is the NetApp® Data ONTAP® operating system available from NetApp, Inc., Sunnyvale, Calif. that implements a Write Anywhere File Layout (WAFL®) file system.

Operating system 214 may further implement a novel migration system 400 to efficiently migrate a storage object such as a vdisk from a source (e.g., storage server 200A) to a destination (e.g., storage server 200B). In particular, migration system 400 is operative to determine a related vdisk (i.e. common parent) available at the destination, determine the changed blocks between the vdisk and the common parent, and supply the changed blocks to the destination. Using the novel migration system, a storage server may ensure that the proper blocks (i.e. changed blocks) are sent to the destination, and further that the optimal amount of blocks (i.e. avoiding redundant blocks) are sent over for offloading processing at the source to the destination.

Storage Operating System

Figure 3:
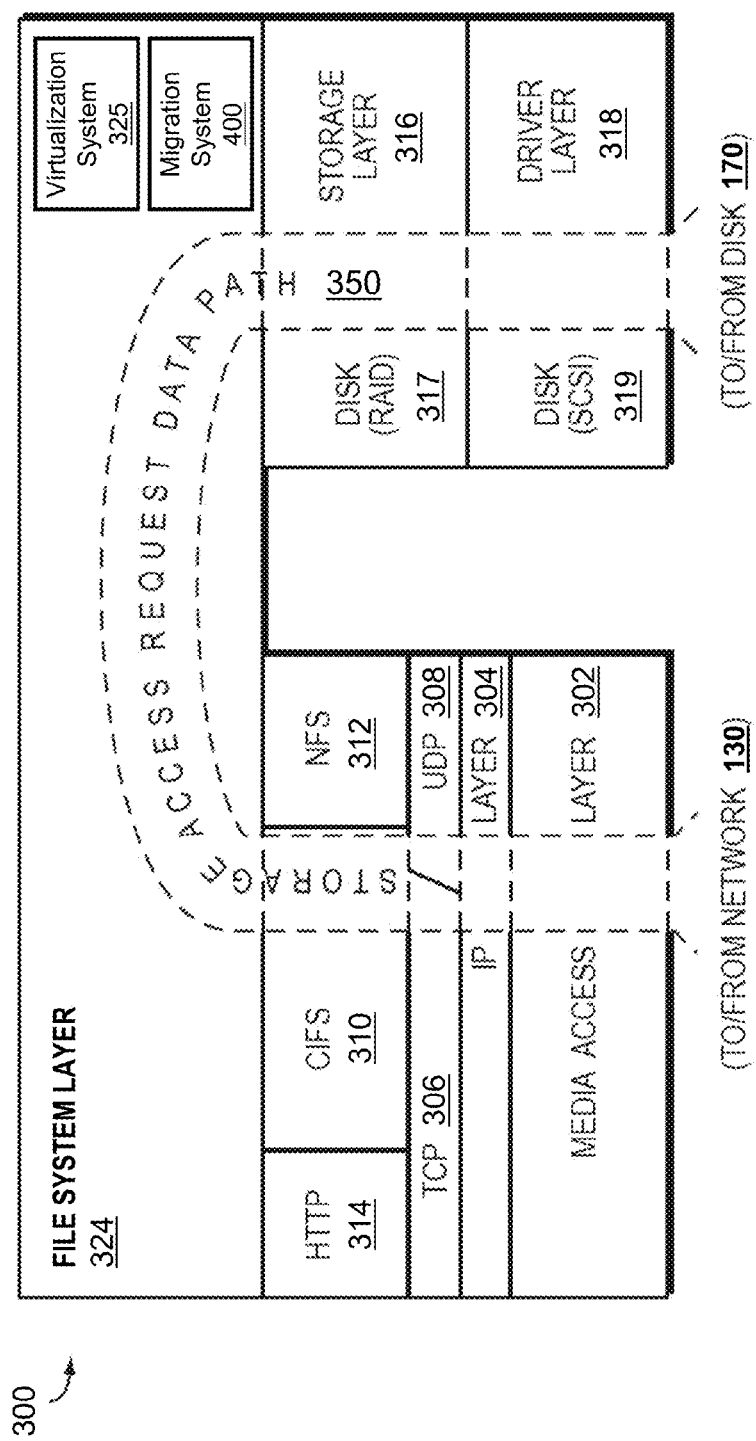
FIG. 3 illustrates a diagram showing the architecture of the storage operating system of the storage server in FIG. 2, according to an embodiment of the present invention.

FIG. 3 is a schematic block diagram of an illustrative embodiment of a storage operating system 300 (e.g., operating system 214 executable on each of storage servers 200) that may advantageously implement the present invention. In FIG. 3, storage operating system 300 includes a series of software modules or layers, including a media access layer 302 of network drivers (e.g., an Ethernet driver). Storage operating system 300 further includes network protocol layers, such as the Internet Protocol (IP) layer 304 and its supporting transport mechanisms, the Transport Control Protocol (TCP) layer 306 and the User Datagram Protocol (UDP) layer 308. A file system protocol layer provides multi-protocol data access and, to that end, includes support for the Common Internet File System (CIFS) protocol 310, the Network File System (NFS) protocol 312 and the Hypertext Transfer Protocol (HTTP) protocol 314. In addition, storage operating system 300 includes a disk storage layer 316 that implements a disk storage protocol 317, such as a RAID protocol, and a disk driver layer 318 that implements a disk access protocol 319 such as a Small Computer Systems Interface (SCSI) protocol.

Bridging the disk software layers with the network and file system protocol layers, in one embodiment, is a file system layer 324 that implements the WAFL file system. The representation of the file system on disk is block-based using, e.g., 4 kilobyte (kB) blocks, and using inodes to describe the files. An inode is a data structure which stores information about a file, directory, or other file system such as user and group ownership, access mode (read, write, execute permissions) and type of file. The illustrative file system uses files to store metadata describing the layout of its file system. These metadata files include, among others, an inode file. A file handle (i.e., an identifier that includes an inode number) is used to retrieve an inode from disk.

As used herein, the term "storage operating system" generally refers to the computer-executable code operable on a computer to perform a storage function that manages data access and may, in the case of storage servers 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage server. Moreover, the teachings of this invention can be adapted to a variety of storage server architectures including, but not limited to, a network-attached storage environment, a storage area network and disk assembly directly-attached to a client or host computer. The term "storage server" should therefore be taken broadly to include such arrangements in addition to any subsystems configured to perform a storage function and associated with other equipment or systems.

Operationally, a request from one of primary clients 110 of FIG. 1A is forwarded as, for example, a conventional CIFS or NFS protocol packet (not shown) over computer network 130 to storage server 200 where it is received at network adapter 225. A network driver of media access layer 302 processes the packet, passes it onto the network protocol layers 304, 306, 308 and CIFS or NFS layer 310, 312 for additional processing prior to forwarding to file system layer 324. Here, file system layer 324 generates operations to load (e.g., retrieve) the requested data from disks 170 if it is not resident in memory 224. If the information is not in memory 224, file system layer 324 indexes into the inode file using the inode number to access an appropriate entry and retrieve a logical volume block number (VBN).

It should be noted that the software "path" (e.g., storage access request data path 350) through the storage operating system layers described above needed to perform data storage access for the client request received at the storage server may alternatively be implemented in whole or in part in hardware. That is, in an alternate embodiment of the invention, the storage access request data path 350 may be implemented as logic circuitry embodied within a field programmable gate array (FPGA) or an application specific integrated circuit (ASIC). This type of hardware implementation increases the performance of the file service provided by the storage server in response to a storage server request packet issued by a host (e.g., one of primary clients 110).

Moreover, in an alternate embodiment of the invention, the processing elements of adapters 225, 228 may be configured to offload some or all of the packet processing and storage access operations, respectively, from processor 222 to a separate processing element to thereby increase the performance of the file service provided by the storage server. It is expressly contemplated that the various processes, architectures and procedures described herein can be implemented in hardware, firmware, by a software-executing general purpose processor, or a combination thereof.

In FIG. 3, storage operating system 300 implements a block-based storage technique that stores files as blocks on disks 170, for example. In one embodiment, storage layer 316 divides the file into block-sized portions and assigns a block of disks 170 to each of the portions. Storage layer 316 is further operative with file system layer 324 to write the file portions, including metadata of the file, to the assigned blocks. The metadata of the file may be included in an inode of the file that also includes pointers to the data blocks constituting the file. To manage a file stored on disks 170, file system layer 324 executes instructions stored in memory 224 to carry out the necessary tasks.

Illustratively, a virtualization system 325 is operative with file system layer 324 to implement a set of vdisk commands that are converted into file system operations to implement a vdisk. These commands enable the file system to translate the logical storage addresses of the vdisk specified in a request from a virtual machine at the host (e.g., one of primary clients 110) into physical locations on disks 170 when storing data to or retrieving data from a vdisk. Virtualization system 325 thus provides a translation layer between physical locations on disks 170 and file system layer 324 for representing vdisks as logical storage addresses to a virtual machine on the host.

To efficiently migrate a storage object from a source to a destination, storage operating system 300 also implements a novel migration system 400. Storage objects may include a vdisk managed by a host (e.g., primary client 110) in a storage system (e.g., system 100), block-level storage objects, file-level storage objects, or other storage objects implemented by other data access services of the storage system. Illustratively, system 400 migrates a vdisk of virtualization system 325 between storage servers in the storage system. To that end, migration system 400 may be operative with virtualization system 325 and file system layer 324 to create and manage vdisks, including parent indicators for associating a vdisk with an earlier created vdisk between which blocks are shared by virtue of a cloned relationship. Migration system 400 is further operative to generate an ancestry of a vdisk upon a request to migrate the vdisk to a destination to indicate a hierarchy of directly and indirectly related vdisks. In one embodiment, migration system 400 creates a vdisk upon request by a host using a list of blocks constituting the vdisk (e.g., inode) of an existing vdisk created at a prior point in time. Upon cloning the inode, migration system 400 generates the parent indicator for the vdisk for associating the newly created vdisk with the vdisk from which it is cloned. Such information may be stored by storage operating system 300 in memory 224 for FIG. 2, for example.

In coordination with file system layer 324, migration system 400 determines the changed blocks between the vdisk to be migrated and a prior created common parent available at the destination. The changed blocks are then transferred from the source storage server using network adapter 225 from FIG. 2, for example, to the destination storage server. At the destination, the vdisk may be constructed using existing blocks thereat as well as the blocks received from the source to efficiently construct the vdisk at the destination. Further aspects of migration system 400 are described in detail below.

Migration System

Figure 4A:
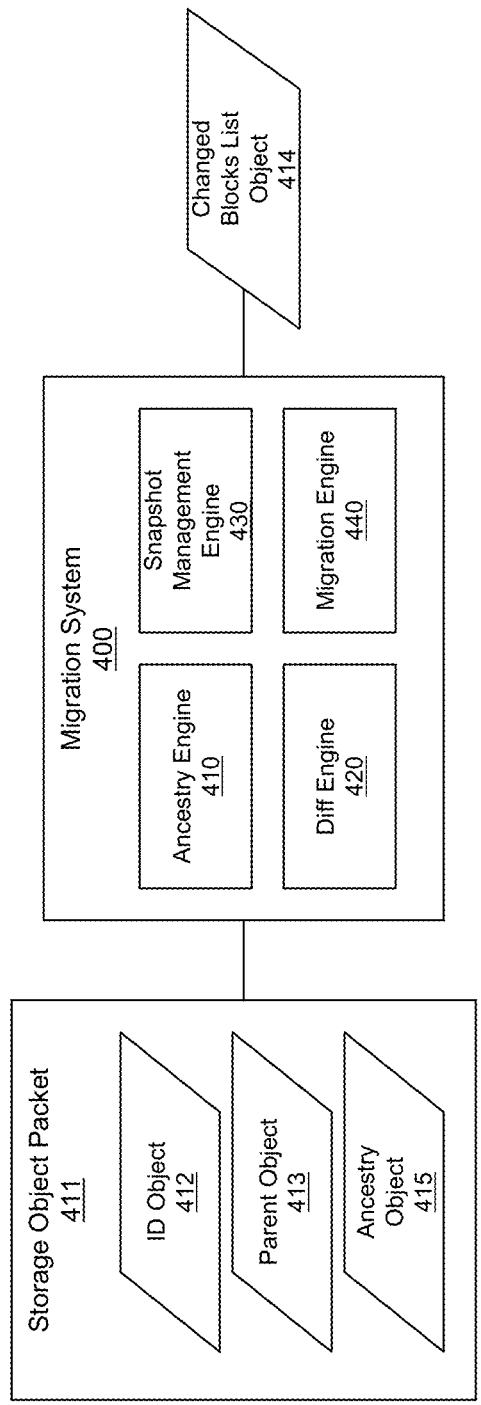
FIG. 4A illustrates a novel migration system implemented by the storage operating system in FIG. 3, according to an embodiment of the present invention.

FIG. 4A illustrates a migration system (e.g., migration system 400 of FIG. 3) operative with storage operating system 300 in FIG. 3, according to one embodiment of the present invention. An ancestry engine 410, a diff engine 420, and a migration engine 440 are operative in migration system 400 for carrying out the functionality of the migration system to determine the set of blocks to transfer from the source to the destination. It is expressly contemplated that the various modules, layers, processes, and procedures described with respect to the migration system can be implemented in hardware, in firmware, by one or more software-executing general purpose processors, or a combination thereof in accordance with various embodiments of the present invention. In one example, instructions are stored in memory 224 of FIG. 2 and executed by processor 222 for performing the operations of the migration system.

For ease of explanation, techniques of the migration system are described with respect to a vdisk managed by a host (e.g., primary client 110) in the storage system (e.g., system 100). However, it will be appreciated by one skilled in the art that such techniques may also be adapted to other types of storage objects implemented a storage system such as file-based, block-based, or content-based storage objects. As such, operations performed by system 400 on a vdisk may also be performed on any type of storage object created and managed by a storage abstraction layer of the storage operating system. Therefore, the present invention is not so limited to the illustrative embodiment described herein.

Illustratively, ancestry engine 410 generates a parent indicator for associating a storage object (child) with another storage object created at a prior point in time (parent) such as when cloning a child from the parent. Cloning may be performed, for instance, by copying a data structure, such as a reference to underlying data blocks, of the parent and associating the copied reference with the child for achieving a common reference to the data blocks. For instance, a reference may include an inode, a logical unit number (lun), or a uniform resource locator (URL) in certain embodiments for indicating the underlying blocks constituting the storage object. In the creation of a storage object (e.g., vdisk), each vdisk may be associated with an alphanumeric representation referred to as an "object ID" for uniquely identifying the vdisks. The object ID may be stored as a data structure such as a ID object 412 in memory 224 of FIG. 2, for example. When cloning a child from a parent, a parent indicator of the child may be generated by storing the object IDs for the parent and child as a data structure in a parent object 413 of memory 224 in one instance.

In certain cases, a vdisk is not cloned from an existing vdisk so the parent's object ID in parent object 413 may be null indicating no parent. One exemplary vdisk having no cloning origin may include a "golden master" which is a vdisk manually configured by a storage administrator, and operative as a template from which one or more later created vdisks may be cloned. As a template, the golden master is not associated with a virtual machine at the host and otherwise provides a preferred or predetermined vdisk configuration constituting blocks commonly referenced by other vdisks. In other embodiments, the golden master may be cloned from a prior created vdisk thereby avoiding manual reconstruction of such a vdisk and then designated as a template from which other vdisks may be cloned.

Aspects of the present invention also include ancestry engine 410 at the source generating an ancestry of a vdisk for indicating a set of one or more existing vdisks with which a newly created vdisk shares at least one block. Ancestry engine 410 generates the ancestry of the vdisk upon the source receiving a request to migrate the vdisk to the destination in one embodiment. In detail, the ancestry of the vdisk includes the object IDs retrieved by ancestry engine 410 accessing the parent indicator of its direct parent as well as the parent indicator(s) of the indirect parents, if any, with such retrieved object IDs stored in a data structure such as an ancestry object 415. The relationship (e.g., direct parent, grandparent, etc.) between each of the object IDs are also indicated in ancestry object 415 to provide a hierarchy including the vdisk and its one or more parents.

FIG. 4B illustrates an exemplary ancestry object 415 for indicating the vdisks with which a newly created vdisk shares at least one block. Here, ancestry information includes a set of object IDs which may be stored in a data structure such as a table in one example, with each row representing a level in the ancestry hierarchy. In the first row of the table, the object ID of the newly created vdisk (denoted "F4") is indicated therein. Ancestry engine 410 may then access the parent indicator of F4 (e.g. parent object 413), retrieve the object ID stored in the parent indicator, and store the retrieved object ID in the next row of the table (e.g., denoted as F2 in row two) thereby representing a next level in the hierarchy. Ancestry engine 410 may further retrieve the object ID from the parent indicator for F2 and store such retrieved object ID in the next row of the table (e.g., denoted as F1 in row three) representing yet another level in the hierarchy. Here, F2 indicates the direct parent of F4 whereas F1 indicates the grandparent of F4. The process of retrieving object IDs from parent indicators may be performed by ancestry engine 410 until, for instance, the golden master is accessed and the parent indicator is null.

Returning to FIG. 4A, upon generating the ancestry of a vdisk an ancestry engine 410' may be operative at the destination to determine the availability of a parent of the vdisk at the destination. Prior to migrating blocks of a vdisk, the source (e.g., via migration engine 440 operative at the source) sends the destination a message including a data structure such as a storage object packet 411 constituting ID object 412, parent object 413, and ancestry object 415 of the vdisk, for example. In response, the destination (e.g., via a migration engine 440' operative the destination) supplies an object ID of a parent available at the destination. Illustratively, migration engine 440' stores storage object packet 411 as a storage object packet 411' at the destination. Using the contents of storage object packet 411' (e.g., ID object 412', parent object 413', and ancestry object 415'), a determination can be made by ancestry engine 410' whether a direct parent is available at the destination by traversing the object IDs at the destination.

When the direct parent is not available at the destination (e.g., there is no match between the object ID of parent object 413' and the object IDs at the destination), ancestry engine 410' determines whether an indirect parent is available at the destination. Preferably, the object ID for the parent at the next level in the hierarchy (e.g., grandparent) is retrieved from ancestry object 415' and used to determine the existence of the grandparent at the destination. For instance, the object ID following the object ID of the direct parent in ancestry object 415' indicates the parent at the next level in the hierarchy (i.e. grandparent). Ancestry engine 410' may then traverse the object IDs at the destination to determine whether the object ID of the grandparent exists at the destination. The processing for traversing the object IDs at the destination for each parent of the vdisk to be migrated may be repeated until a common parent is determined to be at the destination or until a determination is made that no parent is available at the destination. Once a determination is made, migration engine 440' is operative to provide the object ID of the common parent or another indicator (e.g., null value) to the migration engine 440 for requesting blocks to transfer from the source to the destination.

Diff engine 420 is operative at the source to determine the changed blocks between two vdisks, such as the vdisk to be migrated (first vdisk) and its common parent (second vdisk). In one embodiment, diff engine 420 receives the object ID for the first and second vdisks and accesses the inode associated with the object IDs of such vdisks (via file system layer 324 from FIG. 3) to generate a list of blocks for each vdisk. For instance, diff engine 420 may traverse the pointers indicated in the inode to generate the list of data blocks for the first and second vdisks, and store each list in a data structure in memory (not shown). In embodiments of the present invention implementing other types of storage objects, other data structures and/or storage operating system processes operative to determine the underlying data blocks constituting the storage object may be implemented by the migration system to generate the respective block lists. Using the generated block lists, diff engine 420 may then compare blocks of the first vdisk with blocks of the second vdisk to determine the list of changed blocks. The changed blocks list may then be stored in a data structure such as changed blocks list object 414 of memory 224, for example.

In other embodiments, the changed blocks list may be determined by diff engine 420 using a snapshot management engine 430 evaluating snapshots of the file system at the source at various points in time. A snapshot is a space-efficient, point-in-time image of the file system (e.g., file system 324) including the vdisk, that is generated by the operating system (e.g., operating system 300) or other application operative in the storage server. Snapshots may be stored on disks 170 of FIG. 1A, for example. A snapshot tag (an exemplary data structure stored in memory 224 and not shown in this figure) is associated with each snapshot which uniquely identifies the snapshot including a file system name and the date and time the snapshot was created.

When a new vdisk is created, a snapshot may be taken including the newly created vdisk (referred to as the "base snapshot") prior to storing any new data (e.g., servicing a data storage request from a host on the vdisk). The snapshot tag for the base snapshot may be stored in parent object 413 of the newly created vdisk. Parent object 413 may further include information such as the location on disk of the vdisk inode or a range of blocks on disk constituting the vdisk.

Prior to migrating the vdisk to the destination, a second snapshot may be taken which captures the blocks currently referenced by the vdisk (the "current snapshot"). The current snapshot thus includes the data blocks on which new data has been stored. Diff engine 420 may then be operative to compare blocks of the base snapshot and the current snapshot of the specified vdisk by generating a list of blocks for each snapshot and compare the blocks using the generated lists. The changed blocks list resulting from the comparison of snapshots may be stored in changed blocks list object 414 to indicate the blocks which have changed between the parent (e.g., base snapshot) and child (e.g., current snapshot). It will be appreciated that snapshot management engine 430 may be implemented using a software-executing general-purpose processor, firmware, hardware, or a combination thereof. Illustratively, instructions stored in memory 224 are executed by processor 222 in FIG. 2 for carrying out the functionality of snapshot management engine 440.

In certain embodiments of the present invention, snapshot management engine 430 also optimizes storage capacity on disks 170 by deleting select snapshots. For example, snapshot management engine 430 selects the oldest created snapshot (e.g., base snapshot) to delete. Prior to deletion, however, the vdisk referencing the base snapshot constituting the original state of the vdisk before new data is written to the vdisk, is associated with the next oldest snapshot. In this case, the vdisk referencing the base snapshot may be determined by traversing the parent indicators of all the vdisks and selecting the vdisk referencing the snapshot tag of the base snapshot in its parent indicator, for example. The parent indicator of the selected vdisk may then be updated to indicate the next oldest snapshot to form the new association.

Also prior to deletion of the original base snapshot, a changed blocks list is generated by diff engine 420 to determine a changed blocks list between the original snapshot and the next oldest snapshot. The changed blocks list may be stored as a data structure in memory (not shown in this figure) and associated with the next oldest snapshot, the next oldest snapshot now considered a new base snapshot. Thereafter, the original base snapshot may be safely deleted, with the changed blocks list stored in memory and associated with the new base snapshot.

When a changed blocks list is requested by the destination between the current snapshot and its base snapshot, diff engine 420 is operative to compare the new base snapshot with the current snapshot at the specific file or block ranges indicated in the parent object 413. Diff engine 420 further combines the previously stored changed blocks list to the recently generated changed blocks list (i.e. changed blocks between the original base snapshot and the new base snapshot) resulting from the comparison of the new base snapshot and the current snapshot. The combined changed blocks list then constitutes the entire set of blocks which have changed since the time of the original base snapshot. In this way, storage capacity may be optimized while preserving the requisite information regarding a deleted snapshot.

Illustratively, migration engine 440 at the source is operative to receive or generate a request to migrate a vdisk from one storage server to another. For instance, migration engine 440 may receive a request from an administrator (e.g., via migration manager 106) to migrate the vdisk to a particular destination. Alternatively, migration engine 440 generates a request to migrate the vdisk upon reaching a threshold supplied by the administrator at a prior point in time. Upon reaching the threshold, migration engine 440 may communicate with the other storage servers in network 130 of FIG. 1A, for instance, to query the storage servers for their current loading. It will be appreciated that storage servers implement functionality well known in the art to determine loading. Migration engine 440 may then select the least-loaded storage server and migrate the vdisk to such storage server. In yet other instances, the administrator may supply the particular destination to which the vdisk should be migrated upon the source reaching the threshold.

Migration engine 440 is further operative for receiving the object ID of a common parent from a destination. In this case, migration engine 440 supplies data retrieved from disks 170 at the source and provides the retrieved data to the destination. For instance, migration engine 440 is operative at the source with file system layer 324 of FIG. 3 for retrieving the blocks indicated in changed blocks list object 414. Blocks may be delivered from the source to the destination across network 130 via network adapter 225 of FIG. 2. Migration engine 440' at the destination is accordingly operation to supply contents of the updated parent object 413' to the source, including the object ID of the common parent or a null value, for example.

In one embodiment, migration engine 440' associates the received changed blocks with the common parent at the destination for constructing the migrated vdisk. Illustratively, migration engine 440 constructs the vdisk by cloning the inode of the parent and modifying the cloned inode to reference (e.g., point to) the newly received changed blocks. The updated inode file then constitutes the migrated vdisk. The parent's object ID stored in parent object 413' is further associated with the new inode.

When no common parent is available at the destination, diff engine 420 may simply store the entire list of vdisk blocks in changed blocks list object 414. Migration engine 440 is then operative to retrieve and send all the blocks from the source to the destination. At the destination, migration engine 440' is operative with a file system layer 324' of the destination for storing the received blocks to locations on disk and for constructing the inode referencing the newly received blocks using the inode of the common parent already at the destination. Of course, if no common parent exists, a new inode is constructed for the vdisk to point to the newly received blocks.

In the exemplary embodiment, each of the data structures 412, 413, 414, and 415 is stored in memory 224 of FIG. 2 and accessed by components of the respective migration system. Likewise, data structures 413', 413', 414' and 415' may be stored in memory 224' at the destination. In certain embodiments, information stored in such data structures may be stored in a single data object for centralized storage of such information at respective storage servers. Further, each of the data structures may be stored in the same or a different location in memory or on disk as another data structure, so it will be appreciated that the invention is not so limited by the exemplary embodiment described herein.

Exemplary Ancestry

Figure 5:
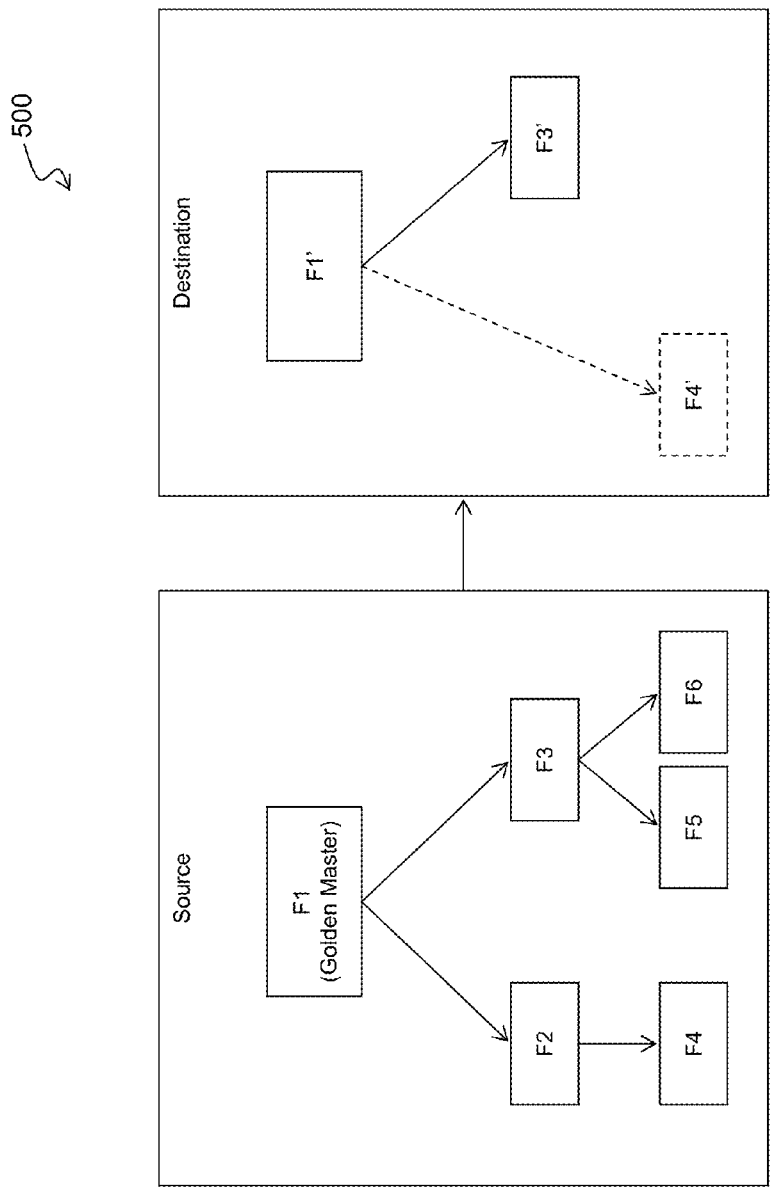
FIG. 5 illustrates an exemplary ancestry of a vdisk and the availability of a common parent at the destination storage server.

FIG. 5 illustrates an exemplary ancestry of a vdisk and the availability of a common parent at a destination storage server (e.g., storage server 110B of FIG. 1A) in accordance with certain embodiments of the present invention. In the exemplary embodiment, the ancestry of the vdisk is created at a source storage server (e.g., storage server 110A) and blocks of the vdisk are provided to the destination using a novel migration system such as migration system 400 of FIG. 4. Further, the ancestry may be stored as a data structure in ancestry object 415, for example.

Illustratively, a storage object embodied as a vdisk is denoted by F[number], whereby each of the vdisks except for the golden master support a virtual machine operative at one of the hosts (e.g., primary clients 110). At the source, F1 is operative as a golden master, whereby F2, F3, F4, F5 and F6 are all cloned (descend) from F1. F2 and F3 are each a child of F1 since they are cloned using the inode of F1. F1 is thereby a parent of F2 and F3. Traversing the hierarchy of vdisks at the source, F4 is a child of F2, whereas F5 and F6 are each a child of F3. F1 thus relates to each of F4, F5, and F6 as a grandparent as an indirect parent.

In one embodiment, a storage administrator (e.g., interfacing with migration manager 106 of FIG. 1A) desires to migrate F4 from the source to the destination as indicated by the arrow drawn between the storage servers. The ancestry of F4 would then include F2 as its direct parent and F1 as its grandparent (or indirect parent). However, only the blocks constituting F1 and F3 are available at the destination (shown as F1' and F3', respectively). Using the ancestry of F4 generated by the migration system at the source, a determination may be made that F1 is available at the destination (i.e. F1') despite the unavailability of its direct parent F2 at the destination.

In the exemplary embodiment, F1' constitutes a portion of F4's data which is already available at the destination since F1' is a copy of F1 having an indirect relationship (e.g., grandparent) to F4. Instead of sending all the data of F4 to the destination thereby occupying network resources, only the differences between F4 and F1 (e.g., changed blocks) need to be provided to the destination for constructing F4 at the destination. Upon receipt of the blocks, a new vdisk F4' may then be cloned at the destination from F1' using the inode of F1' and further referencing the newly received blocks.

By using an ancestry attribute of a vdisk, blocks of the vdisk at the destination may be advantageously identified to avoid sending redundant blocks over the network. The deficiency with the fingerprint approach is eliminated since data blocks already at the destination are determined by identifying a common parent at the destination in contrast to relying on unique fingerprints. Deficiencies with the version approach are also obviated since the ancestry identifies other related vdisks constituting a portion of the same blocks without being configured as a version of the vdisk. Using the novel techniques described herein, the novel migration system presents a more precise determination of required blocks to be migration compared to conventional approaches for ensuring that the appropriate blocks are delivered across the network for efficiently migrating the vdisk to the destination.

Migration a Vdisk

Figure 6:
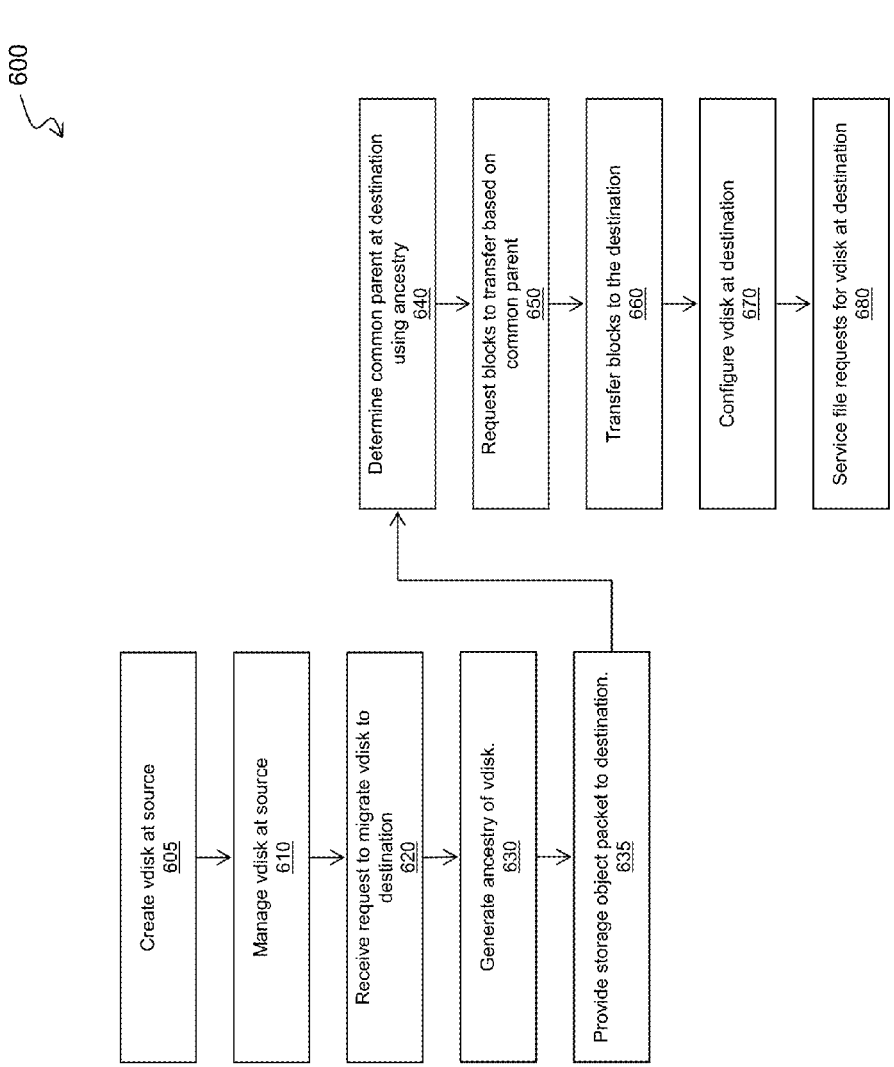
FIG. 6 illustrates a flow diagram of an exemplary process for offloading a vdisk from the source storage server to the destination storage server by determining a common parent of the vdisk available at the destination storage server.

FIG. 6 illustrates an exemplary flow diagram of a process 600 for a novel migration system (e.g., migration system 400 of FIG. 1A) efficiently migrating a vdisk from the source storage server (e.g., storage server 110A) to the destination storage server (e.g., storage server 110B). In the exemplary embodiment, each of the storage servers implement a migration system (e.g., migration system 400 operative the source, and migration system 400' operative the destination) for avoiding transmission of blocks already available at the destination, for instance.

At block 605, a vdisk is created at the source upon request by a host (e.g., primary client 110) connected to the source. When creating the vdisk, the vdisk may be cloned from an existing vdisk at the source by copying the inode of an existing vdisk and associating a new object ID with the copied inode. An administrator interfacing at user console 212 of with migration manager 106, for instance, may indicate which vdisk to use for cloning the new inode. Responsive to the selection by the administrator, ancestry engine 410 of migration system 400, for example, may be operative to generate and associate parent object 413 with the vdisk to indicate the cloned relationship. In instances where the vdisk is not cloned from another vdisk (e.g., a golden master constructed manually), parent object 413 may be null. Upon creation of the vdisk, the new object ID may be provided by the source to the host, where the new object ID and source information (e.g., name, address) are associated with one of the virtual machines.

The source manages the vdisk at block 610 by servicing various data storage requests (e.g., read requests, write requests) from the host intended for the vdisk. In the exemplary embodiment, when a virtual machine issues a data storage request, the host forwards the request to a vdisk at the appropriate storage server. In another embodiment, migration manager 106 manages the associations between virtual machines and vdisks by maintaining a list of virtual machines, hosts, storage servers, and respective vdisks (referred to as a "storage object list"), for instance. When a request from a host is received, migration manager 106 may use the storage object list to determine the associated vdisk and storage server, and forward the request to the appropriate storage server.

At some point in time, however, it becomes desirable to offload the vdisk to the destination. At block 620, migration engine 440 of migration system 400 receives a request from an administrator (e.g., via migration manager 106) to migrate the vdisk to a particular destination. Alternatively, the source may automatically generate a request to migrate the vdisk to the destination when a predefined threshold (e.g., loading) supplied by the administrator. Upon migration system 400 receiving or generating a migration request, ancestry engine 410 generates an ancestry (e.g., ancestry object 415) of the vdisk at block 630. Information related to the vdisk (e.g., storage object packet 411), including the generated ancestry, is then provided by migration engine 440 to the destination (block 635). There, a determination is made whether a parent of the vdisk is available at the destination (block 640) using the parent indicator (e.g., parent object 413 stored locally as parent object 413' at the destination) or ancestry (e.g., ancestry object 415 stored locally as ancestry object 415' at the destination) of the vdisk. Such a parent may be referred to as a "common parent" since blocks of the parent are commonly available at both the source and destination. Illustratively, an ancestry engine 410' of migration system 400' operative at the destination performs a determination of the common parent.

At block 650, a migration engine 440' of migration system 400' at the destination requests blocks of the vdisk from the source. The request may include the object ID of the common parent which has been determined to be available at the destination by ancestry engine 410'. If a parent is not available at the destination, then the request may include no object ID indicating that neither a direct nor indirect parent is available at the destination.

Responsive to the request from the destination, diff engine 420 and migration engine 440 of migration system 400 may be operative to facilitate the transfer of data to the destination at block 660. In particular, diff engine 420 generates and stores a list of changed blocks between the vdisk and the common parent in changed blocks list object 414, for example. When no common parent is available, the absence of a object ID in the request may result in migration engine 440 simply accessing the inode of the vdisk to determine the set of blocks constituting the vdisk and store a list of all such blocks in changed blocks list object 414. Migration engine 440 is then operative to retrieve the appropriate blocks in accordance with changed blocks list object 414 and provide such blocks to the destination.

At block 670, migration engine 440' operative at the destination constructs the vdisk at the destination. Detailed steps for performing the construction at the destination is described further in reference to FIG. 8. When fully constructed, storage requests intended for the vdisk initially at the source may be directed to the destination for performing the request thereat (block 680). In the embodiment where the host maintains the associated storage server and vdisk information, migration engine 440' sends a notification to the host for updating the storage server and vdisk information at the host. When a request from a virtual machine is generated at the host, the host forwards the request to the appropriate storage server (e.g., destination) in accordance with the updated information. In the embodiment where migration manager 106 maintains the storage object list, migration engine 440' sends a notification to migration manager 106 for updating the storage object list thereby associating the vdisk with the destination instead of the source. When a request from a virtual machine of a host is received, migration manager 106 may forward the request to the appropriate storage server indicated in the storage object list.

Migration System Operative at the Source

Figure 7:
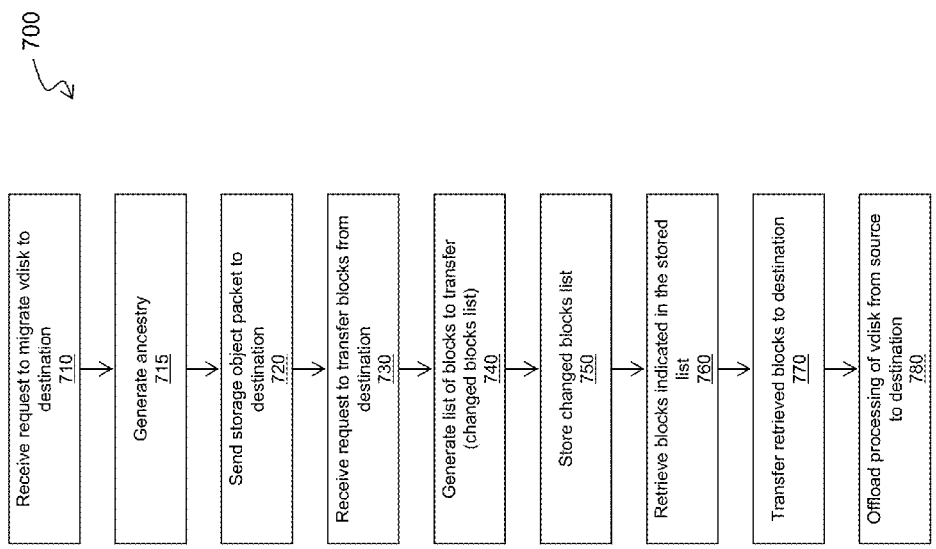
FIG. 7 illustrates a flow diagram of an exemplary process for the source storage server offloading a file to the destination storage server.

An exemplary process 700 is shown in FIG. 7 which illustrates the novel techniques performed at the source (e.g., storage server 110A of FIG. 1A) when offloading a vdisk to the destination in one embodiment. At block 710, the migration engine (e.g., migration engine 440) at the source receives a request to migrate a vdisk to the destination. The request may be supplied by an administrator interfacing with a migration manager (e.g., migration manager 106) and forwarded to the migration engine at the source. Alternatively, the request may be automatically generated by the administrator supplying a loading threshold and a destination name and address to where the vdisk should be migrated when the loading threshold is reached, for example.

At block 715, an ancestry engine (e.g., ancestry engine 410) at the source generates an ancestry of the vdisk to be migrated. Ancestry object 415, for example, may be generated to store the results of a traversal of parent indicators performed by the ancestry engine to determine the parents, of any, of the vdisk. Upon generating ancestry object 415, migration engine 440 sends a file packet such as storage object packet 411 of FIG. 4 to the destination (block 720). Included in the storage object packet is the object ID (e.g., ID object 412) of the vdisk to be migrated and an indicator of the direct parent of the vdisk (e.g., parent object 413) and the generated ancestry (e.g., ancestry object 415) of the vdisk. Responsive to the delivery of the file packet, the source receives a request from the destination to transfer blocks at block 730. The request may include the object ID of the common parent determined by the destination if a common parent exists. If no common parent exists, the request from the destination includes a request for all blocks of the vdisk.

At block 740, the migration engine generates a list of blocks to transfer based on the request from the destination. In the exemplary embodiment, a diff engine (e.g., diff engine 420) may be operative to generate a changed blocks list between the vdisk to be migrated and the vdisk indicated in the request from the destination. Alternatively, when the request indicates that no common parent exists, the diff engine may simply retrieve the entire list of blocks constituting the vdisk to be migrated. At block 750, the diff engine stores the list of changed blocks in a data structure such as changed blocks list object 414 of FIG. 4, for example.

Upon generating the stored list, the migration engine retrieves the blocks indicated in the stored list from storage such as disks 170A from FIG. 1A at block 760. Further, the migration engine transfers the blocks across a network such as network 130 operative between the source and destination (block 770). Upon completing construction of the vdisk at the destination (described further in reference to FIG. 8), the host directs requests of the vdisk to the destination. Alternatively, the migration manager may redirect storage requests to the destination in embodiments where the migration manger manages data storage requests amongst the storage servers. Accordingly, at block 780, the vdisk is offloaded to the destination to alleviate the processing load at the source.

Migration System Operative at the Destination

Figure 8:
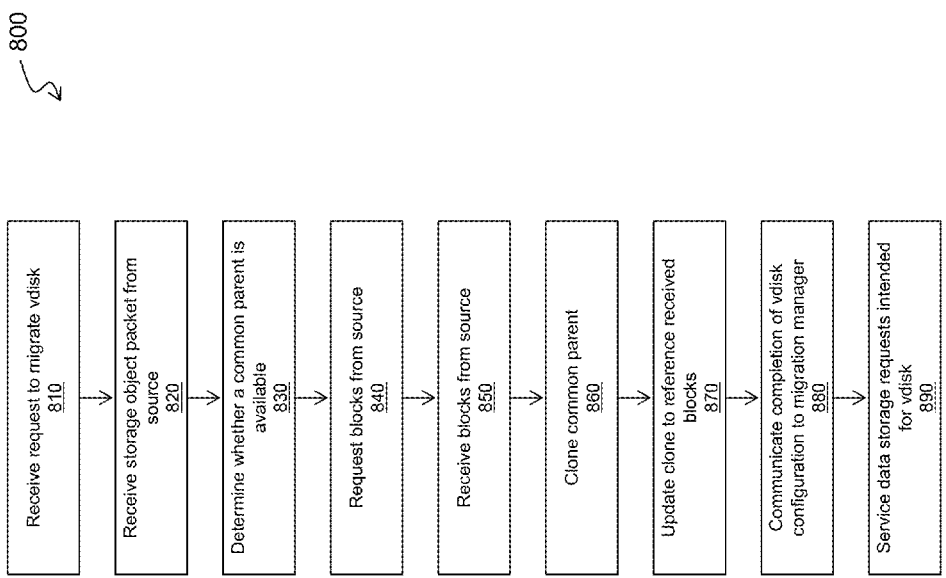
FIG. 8 illustrates a flow diagram of an exemplary process for the destination storage server constructing a vdisk migrated from the source storage server for offloading the file to the destination storage server.

FIG. 8 illustrates an exemplary process 800 for a migration system at the destination (e.g., storage server 110B) constructing a vdisk migrated from the source in one embodiment. At block 810, a migration engine (e.g., migration engine 440') at the destination receives from the migration manager (e.g., migration manager 106) a request to migrate a vdisk from the source. Included in the request is the object ID of the vdisk and the name of the source. The migration engine further receives a storage object packet object (e.g., storage object packet 411) from the source to initiate the migration process between the source and destination (block 820). Illustratively, the received storage object packet is stored by the migration engine in local memory of the destination as storage object packet 411', for instance.

At block 830, a determination is made whether a common parent is available at the destination. In this case, the ancestry engine operative at the destination (e.g., ancestry engine 410') determines the availability of either a direct or indirect parent at the destination using the ancestry (e.g., ancestry object 415') from storage object packet 411'. In other cases, a determination by the ancestry engine may result in no common parent available at the destination. A result of the determination by the ancestry engine thus includes either a object ID indicating the common parent or a null value, for example, indicating no common parent available at the destination.

Upon the determination by the ancestry engine, the migration engine is operative to request blocks of the vdisk from the source (block 840). Included in the request is the object ID of the common parent, if any, to indicate a set of vdisk blocks already available at the destination. To that end, only the changed blocks between the vdisk and the common parent are supplied to the destination responsive to the request. Alternatively, if no common parent is available, then the request results in the destination receiving all the blocks of the vdisk.

In response to the requesting of blocks, migration engine may be operative to receive such blocks (block 850) and to store such blocks at the destination on disks 170B, for example. At block 860, the ancestry engine clones the vdisk at the destination by constructing the vdisk using the inode of the common parent already at the destination. In one embodiment, the inode of the common parent is copied and the object ID of the vdisk from storage object packet 411' is associated with the copied inode. The copied inode is further updated with pointers to the newly received blocks which collectively constitute a list of data blocks for the newly cloned vdisk (block 870). Moreover, the parent object 413' of storage object packet 411' is also associated with the new inode to indicate a common parent as the direct parent of the newly constructed vdisk at the destination.

At block 880, the destination notifies the host when the construction of the vdisk is complete. Alternatively, the migration manager manages storage requests on the vdisk, so the destination notifies the migration manager when the construction of the vdisk is complete resulting in an update of the storage object list associating the destination with the vdisk. At block 890, all data storage requests intended for the vdisk are then forwarded directly by the host (or indirectly by the migration manager) to the destination and thereafter serviced by the destination using the newly constructed vdisk By determining a common parent of the vdisk at the destination, the novel migration system described herein efficiently migrates a vdisk to improve storage system performance when offloading the vdisk from one storage server to another storage server. Since changed blocks are determined based on a common parent at the destination, the deficiency with the conventional fingerprint approach is eliminated. Further, establishing a version relationship between storage objects to indicate shared blocks is no longer required since an indication of shared blocks between storage objects are provided by virtue of a parent indicator and ancestry. By avoiding the delivery of redundant blocks and ensuring the integrity of the received blocks constituting the vdisk, optimized storage capacity as well as improved performance may be achieved using aspects of the inventive techniques described herein.

It will be appreciated that the variations and examples discussed herein are not intended to be exhaustive or to limit the invention. These variations and examples intend to provide further understanding of embodiments of the present invention.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims. For instance, while the exemplary embodiment describes the migration of a vdisk between storage servers, aspects of the novel technique are not limited to merely vdisks, but may broadly apply to any other type of storage object constituting a set of data blocks.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or the like refer to the action and processes of a computer system or similar electronic computing device that manipulates and transforms data represented as physical (e.g., electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g., electronic) data structures and each coupled directly or indirectly to a computer system bus (or the like) for access. Each of these media may be coupled to a computer system bus through use of an appropriate device for reading and or for writing the media.

What is claimed is:

1. A computer-implemented method comprising:
   generating, by a first storage server, an ancestry of the storage object at the first storage server, the ancestry indicating a parent with which the storage object shares a data block;
   upon a request to migrate the storage object to a second storage server, using the ancestry by the second storage server to determine that the parent is stored at the second storage server;
   migrating one or more changed data blocks between the storage object and parent from the first storage server to the second storage server;
   constructing, by the second storage server, a new storage object at the second storage server using the data block at the destination and the migrated one or more changed data blocks; and
   servicing, by the second storage server, data requests intended for the storage object using the newly constructed storage object at the second storage server.

2. A computer-implemented method as in claim 1, further comprising cloning the storage object from the parent and indicating in the ancestry a cloned relationship between the storage object and the parent.

3. A computer-implemented method as in claim 1, wherein cloning comprises copying a reference to underlying blocks of the parent and associating the copied reference with the storage object.

4. A computer-implemented method as in claim 1, wherein the reference comprises one of an inode, a logical unit number, and a uniform resource locator.

5. A computer-implemented method as in claim 1, wherein the storage object is a vdisk of a virtualization system operative at the first and second storage servers for storing data of a virtual machine, the vdisk including operating system, application and user data.

6. A computer-implemented method as in claim 1, wherein the parent is either a direct parent or indirect parent of the storage object.

7. A computer-implemented method as in claim 1, wherein the storage object shares the data block with the parent by the storage object and the parent both referencing the data block.

8. A computer-implemented method as in claim 1, wherein the parent is available at the second storage server when an object ID of the parent is determined to be at the second storage server.

9. A computer-implemented method as in claim 1, wherein the constructing of the new storage object comprises:

copying a block list of the parent at the second storage server, the block list referencing a set of data blocks constituting the parent;

associating an object ID of the storage object with the copied block list; and updating the copied block list by referencing the one or more changed data blocks.

10. A computer-implemented method as in claim 1, further comprising determining the changed data blocks by comparing a first block list of the storage object and a second block list of the parent.

11. A computer-implemented method as in claim 1, further comprising determining the changed data blocks by comparing a base snapshot and a current snapshot, the base snapshot including the storage object prior to storing new data and the current snapshot including the storage object subsequent to storing new data.

12. A computer-implemented method comprising:

generating by a first storage server a storage object from a parent, the storage object associated with the parent using a parent indicator of the storage object;

upon a request to migrate the storage object to a second storage server, sending by the first storage server an ancestry to the second storage server, the ancestry generated by the first storage server indicating the parent with which the storage object shares a data block; and responsive to the sending, receiving by the first storage server a request from the second storage server for changed data blocks between the storage object and the parent when the parent is stored at the second storage server;

determining by the first storage server the changed data blocks between the storage object and the parent; and sending by the first storage server the determined changed data blocks to the second storage server for constructing the storage object at the destination thereby offloading the storage object to the second storage server.

13. A computer-implemented method as in claim 12, further comprising cloning the storage object from the parent and indicating in the ancestry a cloned relationship between the storage object and the parent.

14. A computer-implemented method as in claim 12, wherein the storage object is a vdisk of a virtualization system operative at the first and second storage servers for storing data of a virtual machine, the vdisk including operating system, application and user data.

15. A computer-implemented method as in claim 12, wherein the parent is an indirect parent of the storage object.

16. A computer-implemented method as in claim 12, wherein the storage object is generated by copying a block list of the parent and generating a new object ID for the copied block list.

17. A computer-implemented method as in claim 12, wherein the parent is available at the second storage server when an object ID of the parent is determined to be at the second storage server.

18. A computer-implemented method as in claim 12, wherein the constructing of the new storage object comprises:

copying a block list of the parent at the second storage server, the block list referencing a set of data blocks constituting the parent;

associating an object ID of the storage object with the copied block list; and updating the copied block list by referencing the one or more changed data blocks.

19. A computer-implemented method as in claim 12, further comprising determining the changed data blocks by comparing a first block list of the storage object and a second block list of the parent.

20. A computer-implemented method as in claim 12, further comprising determining the changed data blocks by comparing a base snapshot and a current snapshot, the base snapshot including the storage object prior to storing new data and the current snapshot including the storage object subsequent to storing new data.

21. A computer-implemented method comprising:

receiving by a destination storage server a request to migrate a storage object from a source storage server, the request including an ancestry of the storage object, the ancestry indicating a parent with which the storage object shares a data block;

determining by the destination storage server that the parent is stored at the destination storage server using the ancestry;

requesting by the destination storage server changed data blocks between the storage object and the parent;

responsive to the requesting, receiving by the destination storage server one or more changed data blocks from the source storage server;

constructing at the destination storage server the storage object using the data blocks at the destination and the one or more changed data blocks from the source storage server; and servicing data requests using the constructed storage object to offload processing of the storage object from the source storage server.

22. A system comprising:

an ancestry engine for generating, by a first storage server, an ancestry of a storage object at the first storage server indicating a parent with which the storage object shares a data block;

a diff engine for determining, by the first storage server, one or more changed data blocks between the storage object and the parent when the parent is determined to be stored at a second storage server; and a migration engine for sending, by the first storage server, the changed data blocks from the first storage server to the second storage server, and for constructing, by the second storage server, the storage object at the second storage server using the changed data blocks to offload processing of the storage object from the first storage server to the second storage server.

23. A system of claim 22, further comprising a snapshot management engine for:

generating a base snapshot of the storage object prior to storing new data; and generating a current snapshot of the storage object upon a request to migrate the storage object to the second storage server.

24. A system of claim 23, further comprising the snapshot management engine for:

retrieving the base snapshot of the storage object;

generating a changed blocks list between the base snapshot and a next oldest snapshot of the storage object;

designating the next oldest snapshot as a new base snapshot;

associating the changed blocks list with the new base snapshot;

deleting the base snapshot, and determining the one or more changed data blocks using the changed blocks list and comparing the new base snapshot and the current snapshot to identify changed blocks between the base snapshot and the current snapshot.

25. A system comprising:
an ancestry engine for determining, by a source storage server that a parent indicated in an ancestry of a storage object at the source storage server is stored at a destination storage server, the storage object referencing a data block of the parent; and
a migration engine for:
  requesting, by the destination storage server, changed data blocks between the storage object and the parent;
  receiving, by the destination storage server, the requested changed data blocks from the source storage server; and
  constructing, by the destination storage server, the storage object at the destination storage server for offloading processing of the storage object from the source storage server to the destination storage server.

26. A system comprising:
a first storage server for cloning a storage object from a parent and generating an ancestry of the storage object, the ancestry indicating the parent with which the storage object shares a data block;
a second storage server coupled to the first storage server for determining that the parent is stored at the second storage server using the ancestry and constructing the storage object at the second storage server upon obtaining, changed data blocks between the storage object and the parent from the first storage server; and
a migration manager for initiating a request to migrate the storage object from the first storage server to the second storage server, the request causing the first storage server to supply the ancestry the second storage server for determining blocks available at the second storage server prior to the first storage server sending the changed data blocks to the second storage server.

27. A system of claim 26, wherein the migration manager is operative in the first storage server.

28. A system of claim 26, wherein the migration manager is operative in a remote device from the first and second storage servers.

29. A system of claim 26, wherein the migration manager manages a storage object list data structure indicating a first set of storage objects served by the first storage server and a second set of storage objects served by the second storage server, the storage object list updated upon the constructing to enable the migration manager to send data storage requests intended for the storage object to the second storage server instead of the first storage server.

30. A computer-implemented method comprising:
copying, by a storage server, a block list of an existing storage object, the block list referencing a set of data blocks constituting the parent;
generating a new storage object using the copied block list, the new storage object sharing a data block with the existing storage object;
generating a parent indicator for the new storage object, the parent indicator including an object ID of the existing storage object; and
indicating a shared data block between the existing storage object and the new storage object by the parent indicator referencing the existing storage object.

31. A computer-implemented method as in claim 30, further comprising generating an ancestry of the new storage object using the parent indicator to indicate a set of storage objects with which the new storage object shares data blocks.

32. A computer-implemented method as in claim 31, wherein the storage server is a first storage server and the method further comprising:
providing, by the first storage server, the ancestry to a second storage server;
determining, by the second storage server, whether the existing storage object is at the second storage server using the ancestry;
sending, by the first storage server, changed blocks between the existing storage object and the new storage object when the existing storage object is determined to be at the second storage server; and
constructing, by the second storage server, the storage object using the data block at the second storage server and the changed blocks for servicing a data storage request at the second storage server instead of the first storage server.

* * * * *